Dec. 17, 1935.  E. W. MILLER  2,024,380
GEAR SHAPING TOOL
Original Filed Jan. 26, 1928  3 Sheets-Sheet 1
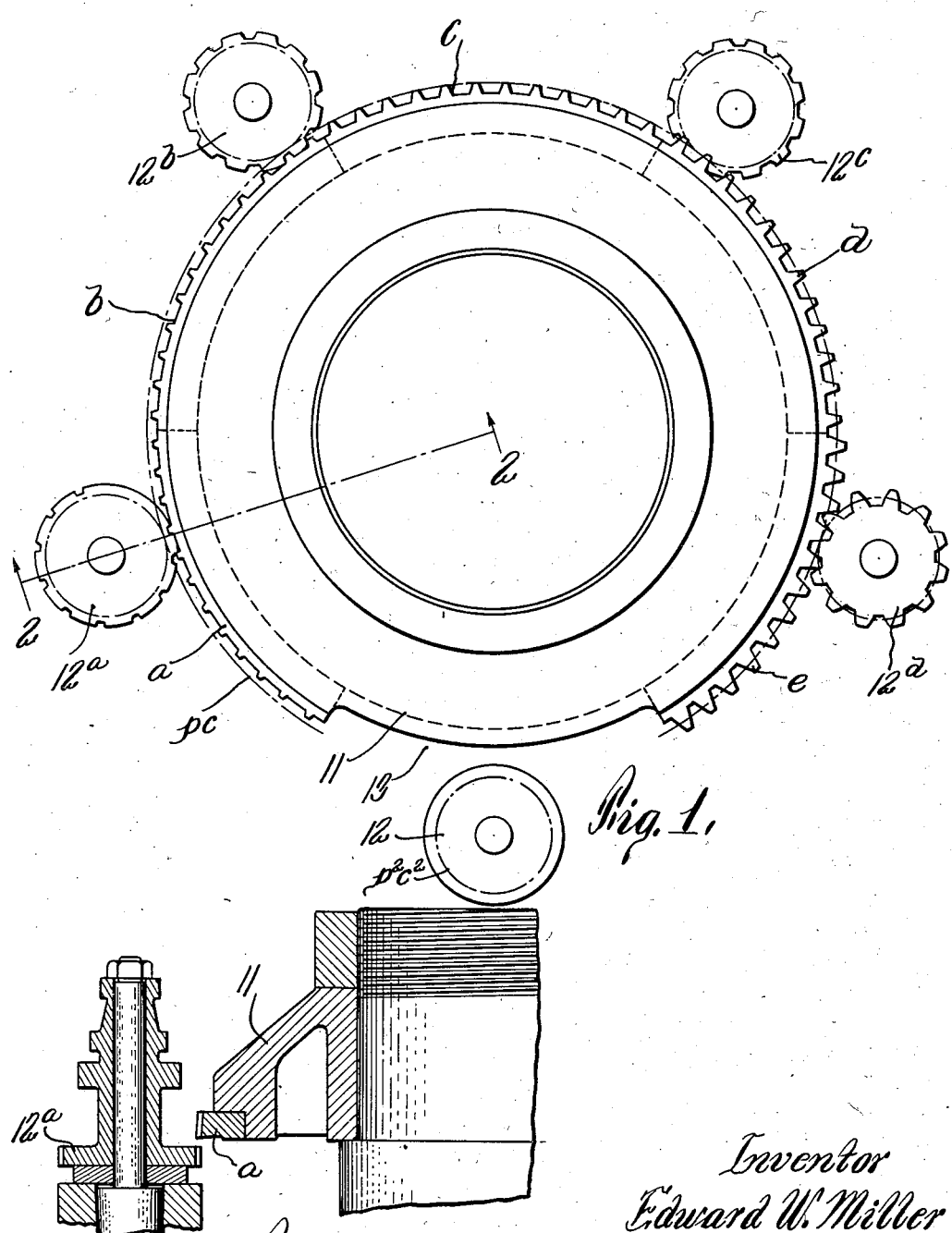

Dec. 17, 1935.  E. W. MILLER  2,024,380
GEAR SHAPING TOOL
Original Filed Jan. 26, 1928  3 Sheets-Sheet 2

Inventor
Edward W. Miller
by Wright, Brown, Quinby & May
Att'ys

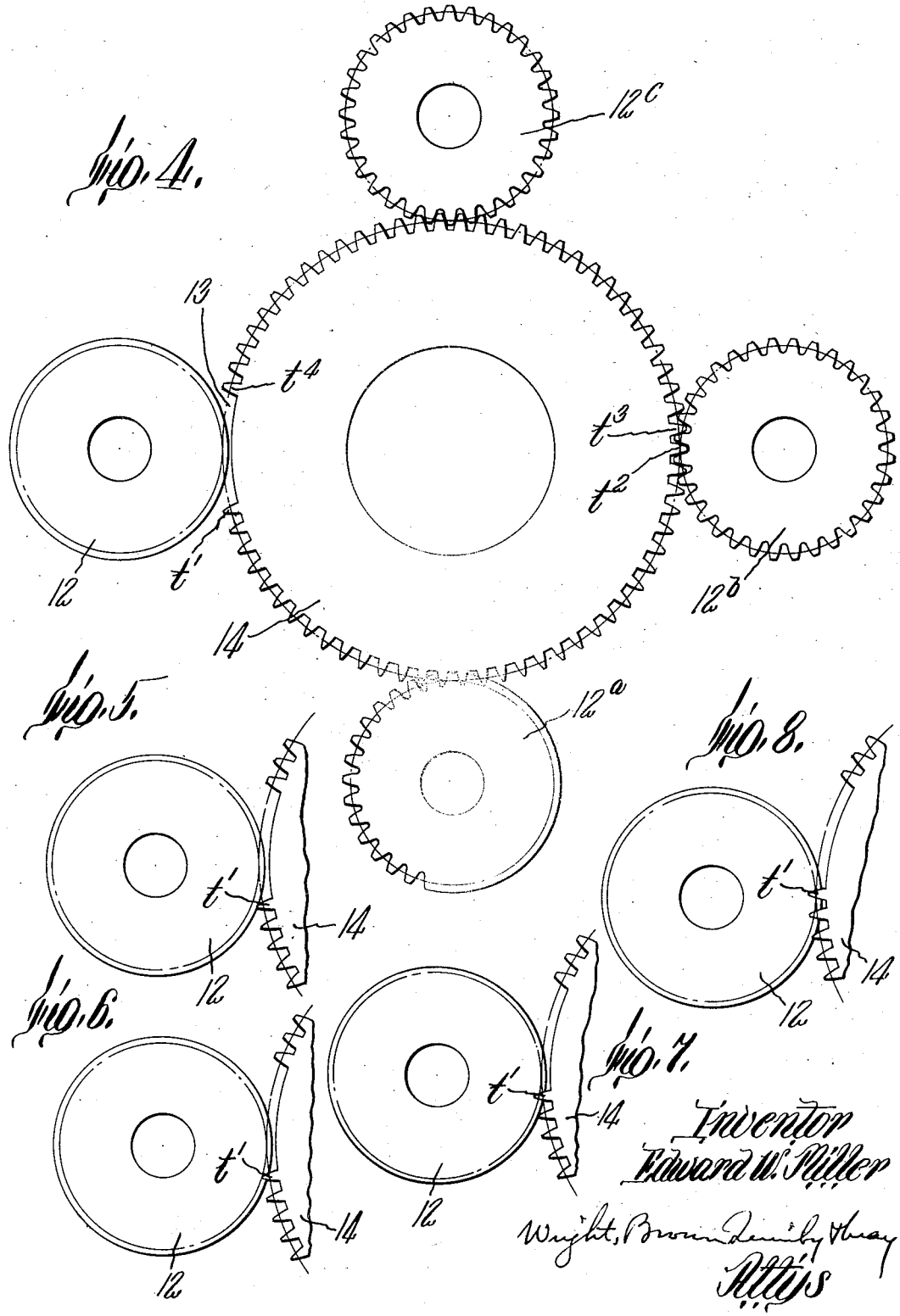

Patented Dec. 17, 1935

2,024,380

UNITED STATES PATENT OFFICE 2,024,380

GEAR SHAPING TOOL

Edward W. Miller, Springfield, Vt., assignor to The Fellows Gear Shaper Company, Springfield, Vt., a corporation of Vermont Original application January 26, 1928, Serial No. 249,569. Divided and this application September 25, 1933, Serial No. 690,851

16 Claims. (Cl. 29—103)

The invention herein relates to gear cutters of the shaping type, i. e., cutters which have a form similar to standard gears, with modifications to provide cutting edges, and preferably also a top rake, at the ends of its teeth and cutting clearance at the sides, and are operated by axial movement relative to the work so as to cut with a planing action as distinguished from the movement and operation of a milling cutter. It is the purpose of the invention to provide a form of cutter which may be used without any preliminary radial depth feed.

In order to explain the significance of the purpose just stated I would say that prior to my present invention, the universal practice in cutting gears by the shaping process has been to use a cutter which is equipped with a complete series of teeth equally spaced around its entire circumference, like the teeth of a gear designed to run continuously in one direction, and to feed the cutter radially toward the work piece, or vice versa, until the teeth of the cutter have penetrated to the full required depth into the work. This depth feed is a step additional to the rotational or generative feed by which the full number of teeth and their face curvature are generated in the work. Whether the depth feed is carried on before commencement of the rotary feed, or simultaneously with the rotary feed, the fact remains that the work must be rotated throughout a complete rotation after the cutter has been fed in fully to the required depth, in order that all of the teeth in the work may be accurately generated and cut to the full depth. The depth feed of course must be effected gradually and in the course of a multiplicity of cutting strokes performed by the cutter. The time required for this depth feed is always a substantial proportion of the entire cycle of cutting a gear; being greater of course with gears of small than of large pitches, but a substantial proportion of the full cycle in any event.

It is the purpose of the present invention to obviate the necessity of the depth feed as a factor or step in the cycle of cutting a gear by the gear shaping process. I have accomplished this object by providing cutters of the gear shaper type having a gap or open space at one side wide enough to permit placement of the cutter and a gear blank in pitch circle relationship with each other without bringing them into actual contact, when both are in the same plane, and by making the cutter of sufficiently large radius to accommodate in the balance of its circumference at least enough teeth to generate and cut the full number of teeth required to be cut in the work piece in consequence of rotational feed only (combined of course with reciprocative cutting travel) and without any depth feed in the radial direction or any component of radial movement. The invention is related to my application for Multiple spindle gear shaping machine, Serial No. 249,569, filed January 26, 1928, (on a continuation of which Letters Patent 1,990,240 were issued February 5, 1935), and is a division thereof. The invention herein comprises the specific cutters disclosed in said parent application as part of the machine combination therein claimed, and also all variations and modifications thereof which include the same essential principles.

Like reference characters designate the same parts wherever they occur in all the figures.

In the drawings,—

Fig. 1 is a plan view of one form of cutter containing the present invention, the same being adapted to operate simultaneously and successively on a series of work pieces and corresponding to the cutter shown in Fig. 14 of my parent application aforesaid;

Fig. 2 is a detail cross section on line 2—2 of Fig. 1;

Fig. 4 is a similar view of a cutter of the same general character but designed to finish the work in two steps;

Figs. 5, 6, 7 and 8 are fragmentary views showing successive stages in the commencement of the cutting operation performed by the cutters shown by Fig. 4, and illustrating the principle common to all cutters of this invention.

Figure 3:
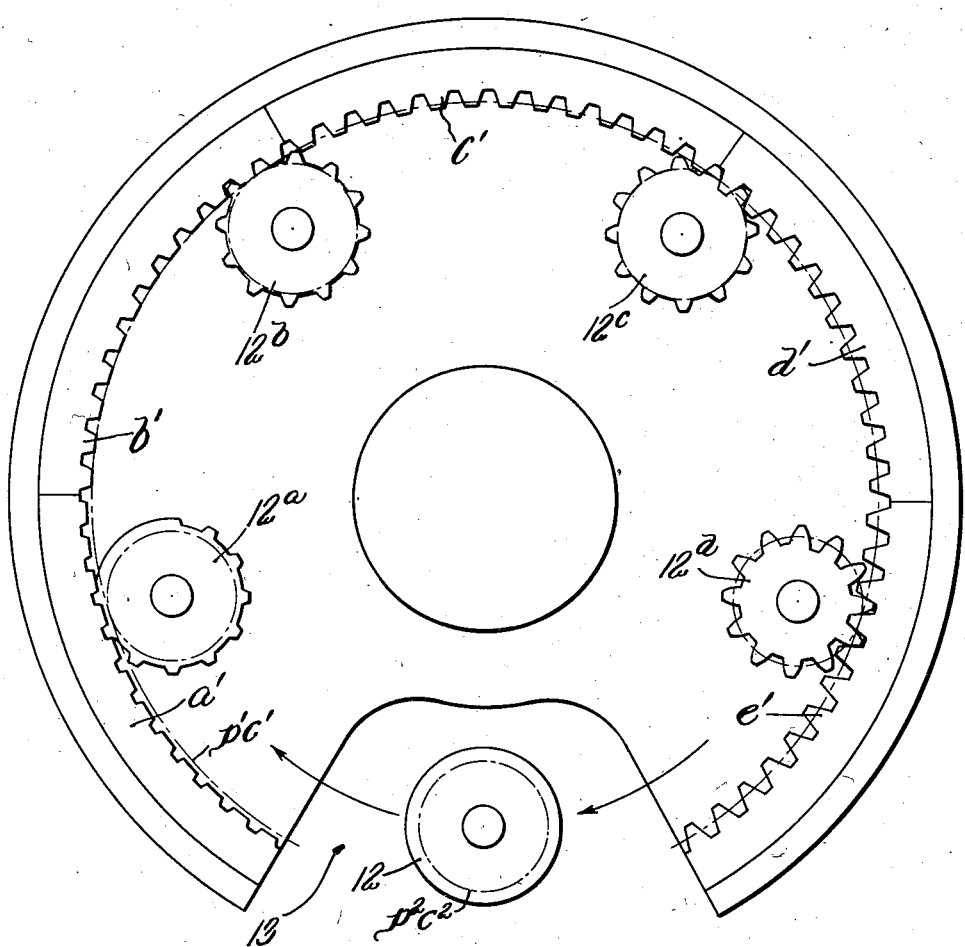
Fig. 3 is a view similar to Fig. 2 of another form of cutter embodying the invention, being the form shown in Fig. 11 of said parent application.

Referring to Figs. 1 and 2, there is shown here a cutter head 11 adapted to commence operation on a work piece without preliminary depth feed and having its teeth arranged in a number of sets or series designed to cut successively more deeply into the blank so as to finish a gear in five steps. In this instance the teeth are provided in a number of segments a, b, c, d and e, each having a number of teeth at least as great as the number to be cut in the work piece. It is of course possible to provide a greater number of teeth in each segment; but it is not desirable to do so because the larger number of teeth is of no advantage and is a greater expense. The teeth of all the segments are arranged on the same pitch circle, shown by broken lines at pc, and are equally spaced thereon. Those of the first segment a are designed to penetrate to only slight depth and width in the peripheral part of the work piece; and those of successive segments b, c, etc. are of progressively greater height and width, until those of the final segment e are of the depth and width of a gear fully conjugate to the finished work piece.

A work piece 12, which is a cylindrical gear blank, is mounted on a work spindle beside the gap 13 in the periphery of the cutter head, where no teeth are present; and as this work piece is carried with a planetary motion around the cutter head, (or, conversely, the cutter head is rotated upon its own axis while the work also is rotated in harmony therewith) while the cutter is reciprocated axially, the work is cut in a succession of steps until, when it rolls out of mesh with the cutter segment e, it is a finished gear. Preferably a number of work spindles are provided so as to hold a series of work pieces 12, 12a, 12b, etc. to be cut simultaneously as well as progressively.

Fig. 2 shows the work piece as the largest element of the cluster gear of an automobile transmission mechanism. It is obvious of course that any type or character of gear may be cut by such a cutter.

Attention is called to the before named Patent No. 1,990,240 for illustration of mechanism suitable to effect relative movements of the character above described between the cutter and work pieces.

Fig. 3 illustrates a variation of the cutter above described in which the cutter teeth are arranged similarly to the teeth of an internal gear, on a pitch circle $p'c'$. They are otherwise like those of the cutter first described in being arranged in a number of series or segments $a'$, $b'$, $c'$, $d'$ and $e'$ of progressively increasing heights. In this case also, the work piece 12 is placed on its work spindle in a blank or cut out side of the cutter head with its periphery actually out of contact with any part of the cutter, but overlapping the continuation of the circle in which the cutter teeth are arranged. In short, the work piece is located with its pitch circle $p^2c^2$ tangent to the pitch circle of the work piece, or its continuation. This situation obtains with all forms of my present cutter invention, including those yet to be described, as well as those already described.

Fig. 4 shows an equivalent embodiment of the same principles in a cutter 14 designed to perform the complete cutting and finishing operation in two stages, and in which the teeth are all integral with the body part of the tool. It has a blank space or gap 13 at one side, as in the forms previously described. One half of the teeth, from $t'$, around the under side (as shown here) of the cutter to $t^2$, are slightly narrower than standard thickness, while the remainder of the teeth, from $t^3$ to $t^4$, are of standard thickness. The first set or series, $t'$—$t^2$, are designed to make a preliminary cut in each of the work pieces, and the second set or series, $t^3$—$t^4$, to finish the work piece teeth to standard thickness by a second cut which may be lighter at each stroke than the cuts by the teeth of the first series. In each series there are at least as many teeth as the number of teeth to be cut in the work, and may be more. Each work piece makes a complete rotation about its own axis while in engagement with the first series and another complete rotation in engagement with the second series. As a matter of fact, in the complete cycle of operations, the work piece is turned through slightly more than two rotations for each complete rotation of the cutter; this excess being required on account of the gap 13.

This figure shows four work pieces, 12, 12a, 12b and 12c, spaced equiangularly around and equidistant from the axis of the cutter; thus illustrating the fact that the invention is not limited as to the number of pieces which may be cut at the same time by a given cutter. There may be as many as there is room for in the space around the cutter without interference of one work piece with the next. The work pieces may be either revolved or rotated in a planetary manner around the cutter, or may be rotated around stationary axes while the cutter rotates on its own axis.

I have shown by Figs. 5–8 inclusive how the characteristics of the present invention enable the work to be started and finished by rotary generative feed alone and without any radial depth feed. Assuming that the blank has been placed on the work spindle in the center of the gap of the cutter, a sufficient increment of rotation brings the tooth at one boundary of the gap in the cutter, as the tooth $t'$, into overlapping relationship with the work piece, so that in its reciprocating motion it cuts a groove therein. Successive further increments of rotation occurring between cutting strokes cause the tooth $t'$ to be fed progressively deeper and deeper into the work until eventually the next tooth comes into action, and the space conjugate to the tooth $t'$ is completely finished; but this feed is the same rotary feed which generates the tooth forms in the work, and is tangential to the work piece, not the depth feed of the prior art. Thereafter the rotation and reciprocation proceed until the work piece is finished. The increments of rotary feed between successive cutting strokes are equal throughout the cycle, and the duty or service required of all the cutter teeth is the same. No teeth are required to do double duty, as is required when some of them are first utilized to perform the depth feed, and then all are used in performing the rotary generation. And of course all of the time heretofore expended in performing the depth feed is saved in the case of machines equipped with this invention.

It is within my contemplation to use cutters of the type here shown, and particularly those of the design shown in Figs. 4-6 inclusive with gear shaping machines having the means characteristic of standard gear shaping machines for rotating the cutter and reciprocating it; and to combine therewith a multiplicity of work holders of the same general character as those of the standard machines. It is not obligatory that the work spindles be given a planetary motion around the axis of the cutter spindle in all cases.

This process, and cutters of the type here disclosed, are applicable for cutting, not only spur gears, but also helical gears, crown gears, and all other machine elements having teeth or lobes capable of being generated by the planing action of a conjugate cutter, with mutual, rolling action between the cutter and work, whatever the specific shapes of such teeth or lobes may be.

What I claim and desire to secure by Letters Patent is:

1. A gear shaper cutter having teeth arranged on a curved pitch line similarly to the teeth of a gear wheel, but throughout less than the whole circumference of the cutter, and having a space at one side sufficiently wide to permit placement of a gear blank in pitch line relationship to the cutter without making contact with any tooth.

2. A gear shaper cutter having a series of equispaced cutter teeth arranged on a curved pitch line and being equal in number to the number of teeth to be cut in a given gear, one side of such cutter having a gap sufficiently wide to permit the blank for the contemplated gear to be placed in pitch line relationship with the cutter and at the same time clear of contact with the cutter teeth at each side of such gap.

3. A gear shaper cutter having a circumferential series of teeth arranged in pitch line sequence similarly to the teeth of a gear with a gap between them at one side of the cutter sufficiently wide and deep to permit placement of an uncut gear blank in pitch line tangency with the cutter out of contact with any part of the cutter.

4. A gear shaper cutter having a series of gear-like planing teeth arranged on a circular pitch line and being interrupted at one side of the cutter through a width sufficient to admit an uncut blank into pitch line relationship with the cutter.

5. A gear shaper cutter having a series of gear-like planing teeth arranged on a circular pitch line and being interrupted at one side of the cutter through a width sufficient to admit an uncut blank into pitch line relationship with the cutter, the number of teeth of the cutter being at least as great as the number of teeth to be formed in the work piece.

6. A gear shaper cutter having a series of gear-like planing teeth arranged on a circular pitch line and being interrupted at one side of the cutter through a width sufficient to admit an uncut blank into pitch line relationship with the cutter, the number of teeth of the cutter being a multiple of the number of teeth to be formed in the work piece.

7. A gear shaper cutter having teeth arranged on a pitch line circumference similarly to the teeth of a gear wheel and having a gap at one side wherein there are no teeth, the cutter being more than twice as great in diameter as the gears to be cut and having at least twice as many teeth as the number of teeth to be cut in the work piece, while said gap is sufficiently wide to admit an uncut gear blank into pitch line relationship with the cutter without touching any of the cutter teeth.

8. A gear shaper cutter having teeth arranged on a pitch line circumference similarly to the teeth of a gear wheel and having a gap at one side in which there are no teeth, the cutter being more than twice as great in diameter as the gear to be cut and having at least twice as many teeth as the number of teeth to be cut in such gear, a series of cutter teeth at least as great in number as the teeth to be cut in the gear, being thinner than standard and adapted to perform a roughing cut, while a final series of cutter teeth, equal in number to the teeth to be cut in the work, are of standard depth and thickness adapted to finish the work pieces, said gap being sufficiently wide and deep to admit an uncut gear blank into pitch line relationship with the cutter clear of engagement with the cutter teeth.

9. A gear shaper cutter having a series of cutting teeth arranged and equally spaced along a given pitch line, the number of such teeth being a multiple of the teeth to be cut in the work, and the cutter having at one side a gap sufficiently wide and deep to receive an uncut gear blank in pitch line relationship with the cutter and clear of engagement with the teeth at each side of the gap.

10. A gear shaper cutter having a series of cutting teeth arranged and equally spaced along a given pitch line, the number of such teeth being a multiple of the teeth to be cut in the work and being arranged in groups or sections, each such group containing a number of teeth as great as the number of teeth to be cut in the work, and those of each successive group being adapted to enlarge the cuts made by those of the preceding group in a work piece.

11. A gear shaper cutter having a diameter at least twice as great as the diameter of the gear to be cut and provided with cutting teeth in an arrangement corresponding to that of the teeth of a gear wheel; said teeth being arranged in sets of which the teeth of one set have a height great enough to cut only a fraction of the area of the predetermined tooth spaces to be formed in the work, and those of a second set are constructed to cut a further fraction of the tooth space areas in the work; the number of teeth in each of said sets being at least as great as the number of teeth to be cut.

12. A gear shaper cutter having a diameter at least twice as great as the diameter of the gear to be cut and provided with cutting teeth in an arrangement corresponding to that of the teeth of a gear wheel; said teeth being arranged in sets of which the teeth of one set have a height great enough to cut only a fraction of the area of the predetermined tooth spaces to be formed in the work, and those of a second set are constructed to cut a further fraction of the tooth space areas in the work; the number of teeth in each of said sets being at least as great as the number of teeth to be cut, and the cutter having a blank space at one side of sufficient width and depth to admit an uncut gear blank in pitch line relationship with the cutter clear of engagement with any teeth of the cutter.

13. A gear shaper cutter having a circular series of teeth with cutting edges in a plane perpendicular to the axis of said series, said teeth being arranged in groups each having a number of teeth equal to the teeth of the gears to be cut, and the teeth of each successive group being displaced radially from those of the next preceding group by a distance equal to successive feeding steps.

14. A gear shaper cutter having a series of teeth equally spaced on a pitch circumference whereby to generate teeth in a gear blank by a combination of relative rotational and reciprocative movements, the series of such teeth being sufficiently long to generate a complete series of teeth in a work piece, and the said series of cutter-teeth being separated from the next adjacent tooth of the cutter by a width sufficient to admit an uncut gear blank into full pitch circle tangency with the cutter at the beginning of the cutting cycle.

15. A gear generating cutter of the shaping type of annular formation, having teeth projecting inwardly from its inner circumference arranged on a curved pitch line similarly to the teeth of an internal gear, but throughout less than the whole circumference of the cutter, and having a space at one side sufficiently wide to permit placement of a gear blank in pitch line relationship to the cutter without making contact with any tooth.

16. A gear shaper cutter having an annular form and a series of teeth on its inner circumference arranged in pitch line sequence similarly to the teeth of an internal gear, with a gap between them at one side of the cutter sufficiently wide and deep to permit placement of an uncut gear blank in pitch line tangency with the cutter and out of contact with any part of the cutter.

EDWARD W. MILLER.